(12) United States Patent
DeBie

(10) Patent No.: US 7,831,576 B2
(45) Date of Patent: Nov. 9, 2010

(54) FILE PLAN IMPORT AND SYNC OVER MULTIPLE SYSTEMS

(75) Inventor: Tod DeBie, Costa Mesa, CA (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 11/615,842

(22) Filed: Dec. 22, 2006

(65) Prior Publication Data

US 2008/0154970 A1    Jun. 26, 2008

(51) Int. Cl.
G06F 17/30 (2006.01)
G06F 17/00 (2006.01)

(52) U.S. Cl. ........................ 707/705; 707/790

(58) Field of Classification Search ................ 707/1–6, 707/100–102, 200, 201, 204
See application file for complete search history.

(56) References Cited

U.S. PATENT DOCUMENTS

| | | | |
|---|---|---|---|
| 5,276,901 A | 1/1994 | Howell et al. | |
| 5,410,667 A | 4/1995 | Belsan et al. | |
| 5,692,178 A | 11/1997 | Shaughnessy | |
| 5,701,458 A | 12/1997 | Bsaibes et al. | |
| 5,813,009 A | 9/1998 | Johnson et al. | |
| 5,892,900 A | 4/1999 | Ginter et al. | |
| 5,917,912 A | 6/1999 | Ginter et al. | |
| 5,921,582 A | 7/1999 | Gusack | |
| 6,134,552 A | 10/2000 | Fritz et al. | |
| 6,208,993 B1 | 3/2001 | Shadmon | |
| 6,236,994 B1 * | 5/2001 | Swartz et al. ............... | 707/6 |
| 6,480,851 B1 | 11/2002 | Terek | |
| 6,519,571 B1 | 2/2003 | Guheen et al. | |
| 6,553,365 B1 | 4/2003 | Summerlin et al. | |
| 7,233,959 B2 | 6/2007 | Kanellos et al. | |
| 7,478,088 B2 | 1/2009 | Summerlin et al. | |
| 7,594,082 B1 | 9/2009 | Kilday et al. | |
| 2002/0111960 A1 | 8/2002 | Irons et al. | |
| 2002/0161602 A1 | 10/2002 | Dougherty et al. | |
| 2003/0041198 A1 | 2/2003 | Exton et al. | |
| 2003/0088784 A1 | 5/2003 | Ginter et al. | |
| 2003/0130993 A1 | 7/2003 | Mendelevitch et al. | |
| 2003/0195866 A1 | 10/2003 | Long et al. | |
| 2003/0200234 A1 | 10/2003 | Koppich et al. | |
| 2003/0227487 A1 | 12/2003 | Hugh | |

(Continued)

OTHER PUBLICATIONS

U.S. Appl. No. 11/317,712, filed Dec. 23, 2005, entitled "Dynamic Holds of Record Dispositions During Record Management", invented by T. DeBIE.

(Continued)

*Primary Examiner*—Yicun Wu
(74) *Attorney, Agent, or Firm*—Janaki K. Davda; Konrad Raynes & Victor LLP

(57) ABSTRACT

A technique that provides a file plan including a plurality of containers, wherein each container is capable of providing management information for record information objects assigned to the container, wherein the record information objects represent documents, wherein the file plan comprises one or more segments. Each segment of the file plan at a first records management system is associated with one or more file plan object stores at one or more other records management systems. One or more file plan segments are propagated from the first records management system to the one or more file plan object stores at the one or more other records management systems.

24 Claims, 10 Drawing Sheets

U.S. PATENT DOCUMENTS

| | | |
|---|---|---|
| 2003/0229623 A1 | 12/2003 | Chang et al. |
| 2004/0225730 A1 | 11/2004 | Brown et al. |
| 2005/0102297 A1 | 5/2005 | Lloyd et al. |
| 2005/0165734 A1 | 7/2005 | Vicars et al. |
| 2005/0171914 A1 | 8/2005 | Saitoh |
| 2005/0216467 A1 | 9/2005 | Urakawa et al. |
| 2005/0216524 A1* | 9/2005 | Gomes et al. ............... 707/201 |
| 2005/0262132 A1 | 11/2005 | Morita et al. |
| 2006/0085245 A1 | 4/2006 | Takatsuka et al. |
| 2006/0085374 A1 | 4/2006 | Mayes et al. |
| 2006/0101019 A1 | 5/2006 | Nelson et al. |
| 2006/0149735 A1 | 7/2006 | DeBie et al. |
| 2006/0173932 A1 | 8/2006 | Cortright et al. |
| 2006/0230044 A1 | 10/2006 | Utiger |
| 2006/0288050 A1 | 12/2006 | Wilson |
| 2007/0005595 A1 | 1/2007 | Gafter |
| 2007/0033191 A1 | 2/2007 | Hornkvist et al. |
| 2007/0088585 A1 | 4/2007 | Maguire |
| 2007/0088736 A1 | 4/2007 | DeBie |
| 2007/0130165 A1 | 6/2007 | Sjoblom et al. |
| 2007/0136397 A1* | 6/2007 | Pragada et al. .............. 707/204 |
| 2007/0220001 A1 | 9/2007 | Faden |
| 2007/0226320 A1 | 9/2007 | Hager et al. |
| 2007/0244899 A1 | 10/2007 | Faitelson et al. |
| 2008/0022361 A1 | 1/2008 | Bharadwaj et al. |
| 2009/0055397 A1 | 2/2009 | Man et al. |
| 2009/0077087 A1 | 3/2009 | Urano et al. |

OTHER PUBLICATIONS

U.S. Appl. No. 11/401,994, filed Apr. 11, 2006, entitled "Managing Content Objects Having Multiple Applicable Retention Periods", invented by T. DeBIE.

US Patent Application, filed Dec. 22, 2006, entitled "Using An Access Control List Rule to Generate an Access Control List for a Document Included in a File Plan", invented by T. DeBIE.

US Patent Application, filed Dec. 22, 2006, entitled "Applying Multiple Disposition Schedules to Documents", invented by T. DeBIE.

US Patent Application, filed Dec. 22, 2006, entitled Physical to Electronic Record Content Management, invented by T. DeBIE.

* cited by examiner

FILE PLAN IMPORT AND SYNC OVER MULTIPLE SYSTEMS

BACKGROUND OF THE INVENTION

1. Field of the Invention

The present invention relates to a method, system, and computer program product for file plan import and sync over multiple systems.

2. Description of the Related Art

Enterprise content management systems facilitate managing a variety of information/content (documents) and processes that use such information during the course of enterprise operations. Documents, as used herein, refer to any identifiable logical/physical units of information, including content and transactions generated by the enterprise. A document may comprise an electronic file, object, program, database, image, email, message, etc. or a physical item, such as a paper, file, cassette recording, model, etc. Documents stored in the content management system may not initially be managed as part of a records management system until they go through a "declaration" procedure that creates a corresponding record information object (RIO) for the document. Each RIO may include metadata and a reference to the declared document. The metadata describes/characterizes the declared document. The reference is, for example, a location of the document maintained in an electronic file system or database maintained in a computer-readable media. Alternatively, in the case of a physical document, the reference specifies a physical document location (e.g., a box number, a file cabinet, etc.) where the document is located. Once declared as a record, a document is managed/accessed via the content management system and access to the declared document takes place via the content management system.

Other techniques may not use the RIO/reference model and may instead directly attach record information or metadata to the document or object itself or use other means to track and/or manage records.

The scope of content represented by RIOs is not limited to any particular type of document form or location. A variety of document types are potentially referenced by the RIOs of the records manager. Such document types include, by way of example: formal documents such as permits, invoices, tax records, patents, contracts, claims, manuals etc; informal documents such as email messages (and attachments), text messages, meeting notes, etc.; multimedia content such as audio, video files; and physical containers such as file boxes, cabinets, folders, etc. The documents referenced by the RIOs are potentially stored in a variety of forms and locations. For example, electronic documents including images, text files, forms, etc. are potentially stored in file systems and databases. Physical documents referenced by RIOs are potentially stored in cabinets, boxes, file folders, etc.

After declaring a document, the associated RIO is maintained in an electronic object storage facility referred to as a "file plan object store" including one or more "file plans". In certain cases, file plans for documents may be maintained without a file plan object store. Each file plan comprises an outline/definition for record management based upon a hierarchically arranged set of categories (classes/subclasses) and containers for classifying/organizing/maintaining the RIOs and their associated declared documents. A known file plan arrangement for storing records includes the following containers: categories/sub-categories, record folders, and record volumes. In addition to defining a taxonomy of document types declared within the system, the file plan supports specifying management rules for RIOs placed within particular document categories and sub-categories. Such rules include user role-based access/permissions to RIOs and their associated documents, and defining disposition schedules specifying when particular disposition actions (e.g., transfer, review, destroy, archive, etc.) are to be taken with respect to documents declared under the category. Thus, the known file plan structure can be visualized as a hierarchical tree structure where nodes potentially specify distinct containers (e.g., category or container of categories). Each category within the file plan potentially specifies a set of properties and lifetime document management rules for associated document records.

Also, as an example, a file plan may consist of categories, folders, volumes, schedules, events, actions, workflows, cycles, etc.

A file plan may initially be developed at a development system, and then modified in a production system. Conventional techniques do not easily manage the file plan development and deployment process. With conventional techniques, several manual steps are usually involved. In current systems, export and import are usually separate steps. For example, in one step, an administrator runs a process on SystemA to export the file plan to a file. In the next step, an administrator runs a process on SystemB to import the file plan from the file into SystemB.

There is a need in the art for improved techniques for file plan import and sync over multiple systems.

SUMMARY

Embodiments provide a file plan including a plurality of containers, wherein each container is capable of providing management information for record information objects assigned to the container, wherein the record information objects represent documents, wherein the file plan comprises one or more segments. Each segment of the file plan at a first records management system is associated with one or more file plan object stores at one or more other records management systems. One or more file plan segments are propagated from the first records management system to the one or more file plan object stores at the one or more other records management systems.

Also, embodiments provide a file plan including a plurality of containers, wherein each container is capable of providing management information for record information objects assigned to the container, wherein the record information objects represent documents, wherein the file plan is represented by a file plan container structure, wherein the file plan container structure describes a hierarchical structure of the file plan. One or more portions of the file plan container structure are synced to a file system at an operating system level by replicating the containers of the file plan at a designated location in the file system.

Moreover, embodiments provide a file plan including a plurality of containers, wherein each container is capable of providing management information for record information objects assigned to the container, wherein the record information objects represent documents, wherein the file plan is represented by a file plan container structure, wherein the file plan container structure describes a hierarchical structure of the file plan. The one or more portions of the file plan container structure are synced to a file system at an operating

DETAILED DESCRIPTION

Figure 1:
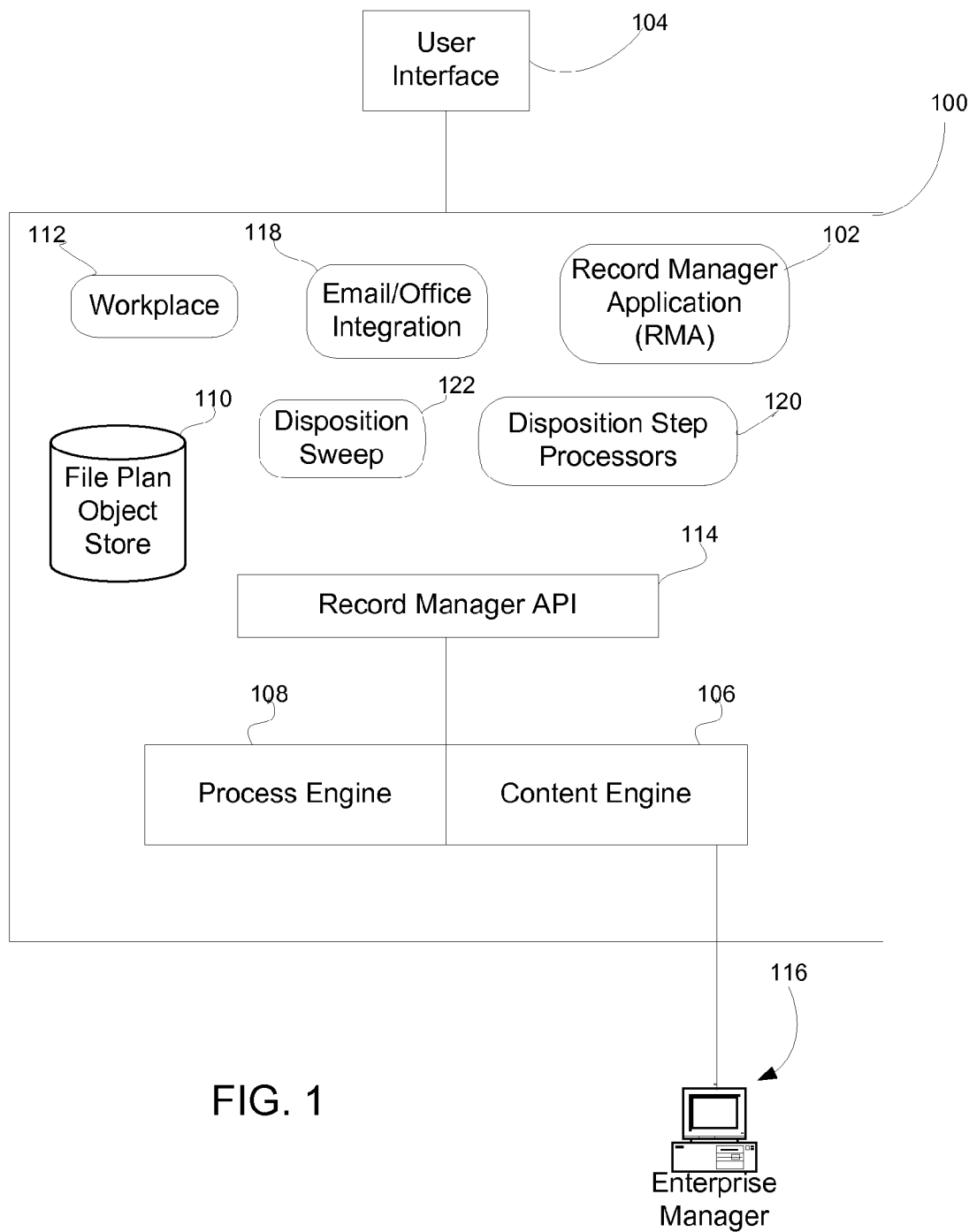
FIG. 1 illustrates an embodiment of a computing environment.

FIG. 1 illustrates an embodiment of a record management system. The record management components execute on a server 100, such as a content server application platform 100, providing a user interface 104 (e.g., Web server) to a variety of content management services via a set of hosted applications. The server 100 comprises an application platform including a collection of components that support records management functionality, including a records manager application 102.

The records manager application 102 (RMA) 102 provides an interface for creating file plans and associated sub-component containers including: categories, sub-categories, record folders, etc. The RMA 102 also processes user commands submitted via a user interface 104 (e.g., a web browser) that may run on a connected client system or the server 100 to enable a user to create and manage record information objects (RIOs) stored within the created file plans. In one embodiment, the RMA 102 does not directly manage documents associated with RIOs. Instead, the RMA 102 manages/administers the previous declared documents via calls to a content engine 106 and a process engine 108. The content engine 106 stores classes, properties and event subscriptions that define records management related data.

Figure 3:
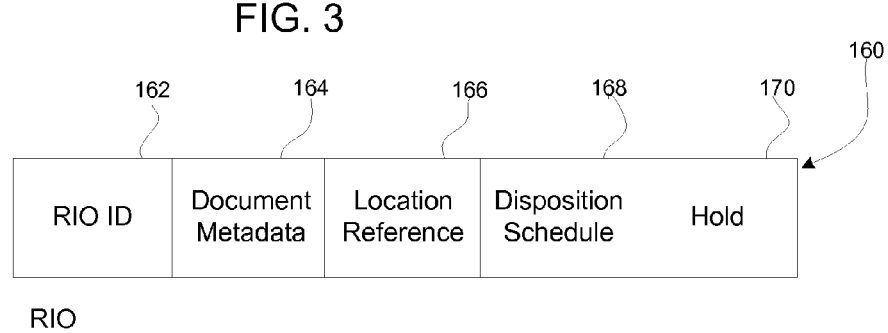
FIG. 3 illustrates an embodiment of information for a record information object.

During a declaration stage, an RIO is created for a new document, and the RIO is stored in a file plan object store 110 (see, FIG. 3). Declaring a new RIO is performed either manually or through automated processes that categorize a newly added electronic document based upon characteristics associated with the electronic document. In the case of automatic declaration of a document, processes automatically analyze the document when it is saved/filed/submitted to the content engine 106. Such analysis involves extraction of, for example, a file system location, file metadata, content within the stored document (e.g., fields within an electronic form), etc. Upon detecting a particular event (e.g., detection of an event and/or expiration of a time period), the RMA 102 initiates actions for disposing (e.g., transfer, review, destroy, archive, etc.) of the document, but not necessarily the corresponding RIO representing the document, from the system.

In one embodiment, the RMA 102 is provided as an "Advanced Author" tool invoked via a workplace application 112 that provides Web access to the functionality of the enterprise content management application. The RMA 102 includes a file plan editor functionality that facilitates defining a hierarchically arranged set (taxonomy) of containers within which RIOs (and their associated declared documents) are stored. RMA 102 further enables the administrator to define one or more disposition schedules for each container (node) defined for a particular file plan.

The RMA 102 enables a user (e.g., a human records manager) via the user interface 104 to create and manage classification schemes (file plans) hierarchically arranging a set of RIOs corresponding to declared documents; create and manage disposition schedules (including potentially assigning multiple disposition schedules to a single container node—e.g., a category, a sub-category, a folder—in a file plan's hierarchy); create and manage the record folders (and folder volumes) that are created under parent container nodes of the file plan; configure the system to specify content engine 106 object classes and properties to manage; create RIOs for managing physical boxes, folders and records; search for categories, folders and records within the file plan hierarchical tree structure; and run pre-defined searches against content engine 106 objects and audit information to generate reports.

In addition to records managers, privileged end users can use RMA 102 to perform tasks such as creating record folders and declaring paper records. In addition, the RMA 102 may be configured with preferences specified under the workplace 112 and leverages the workplace 112 user preference model where applicable. In one embodiment the RMA 102 leverages a records management application program interface (API) 114 providing utilities that support records management functionality. An enterprise manager application 116, which may reside on a separate enterprise manager system or on the server 100, provides an administration tool for managing and creating file plan object stores, defining security, and enabling auditing. The enterprise manager application 116 may enable the following functions: creating object stores and manage services; creating and managing object classes and setting security defaults; configuring auditing; customizing the system to enforce behavior that is customer specific (e.g., customizing events related to records management).

The workplace 112, in addition to providing an entry point into the RMA application 102, provides an interface that end-users and records managers use to capture documents and declare RIOs; declare existing documents as RIOs; participate in record disposition processes via a "tasks" user interface; search for particular RIOs and print search results to generate basic reports; save user favorites (preferences) to aid in classification; and view record content.

Advanced users, records managers and integrators use the "advanced" tools of the workplace 112 such as the process designer and entry template designer to perform the following functions: create document information entry templates that include operations to automate the declaration process; create and modify workflow definitions that define the disposition review process, provide custom disposition actions, and integrate record capture and declaration capability in custom processes; and create custom searches and publishing templates.

An email/office software integration application 118 facilitates declaring mail and other office application documents to be managed in the file plan. Additional functionality provided for records management includes the automated capture of email transmission data as well as support for capturing attachments as separate documents that are linked to the message body.

The content engine 106 provides the repository services for storing file plans and records and is responsible for enforcing security and auditing. The content engine 106 includes a set of application program interfaces that support administering declared/registered documents within the system. The interfaces of the content engine 106 are called by a variety of applications/components of the content management server application platform 100 to implement a variety of functions/services including, in addition to the aforementioned disposition actions, the following: object repository, content storage, content retrieval, version management, relation management, security, content classification, event notifications/subscriptions, document lifecycle management, content searches, etc.

The process engine 108 provides workflow services that support records disposition processes/actions. The actions include process execution, process routing, rules management, process simulation and modeling, and workflow analysis. The process engine 108 may invoke one or more disposition sweeps 122, which represent a set of periodic/scheduled processes that wake up and perform a scan on the set of RIOs in a file plan, calculate record disposition action schedules, and collect a set of responsive RIOs for which disposition actions are presently due for presentation to a user for carrying out the associated disposition actions on the identified records. A set of disposition operation processors 120 provides user interfaces for reviewing record dispositions. The disposition operation processors 120 may be invoked via the workplace 110.

Figure 2:
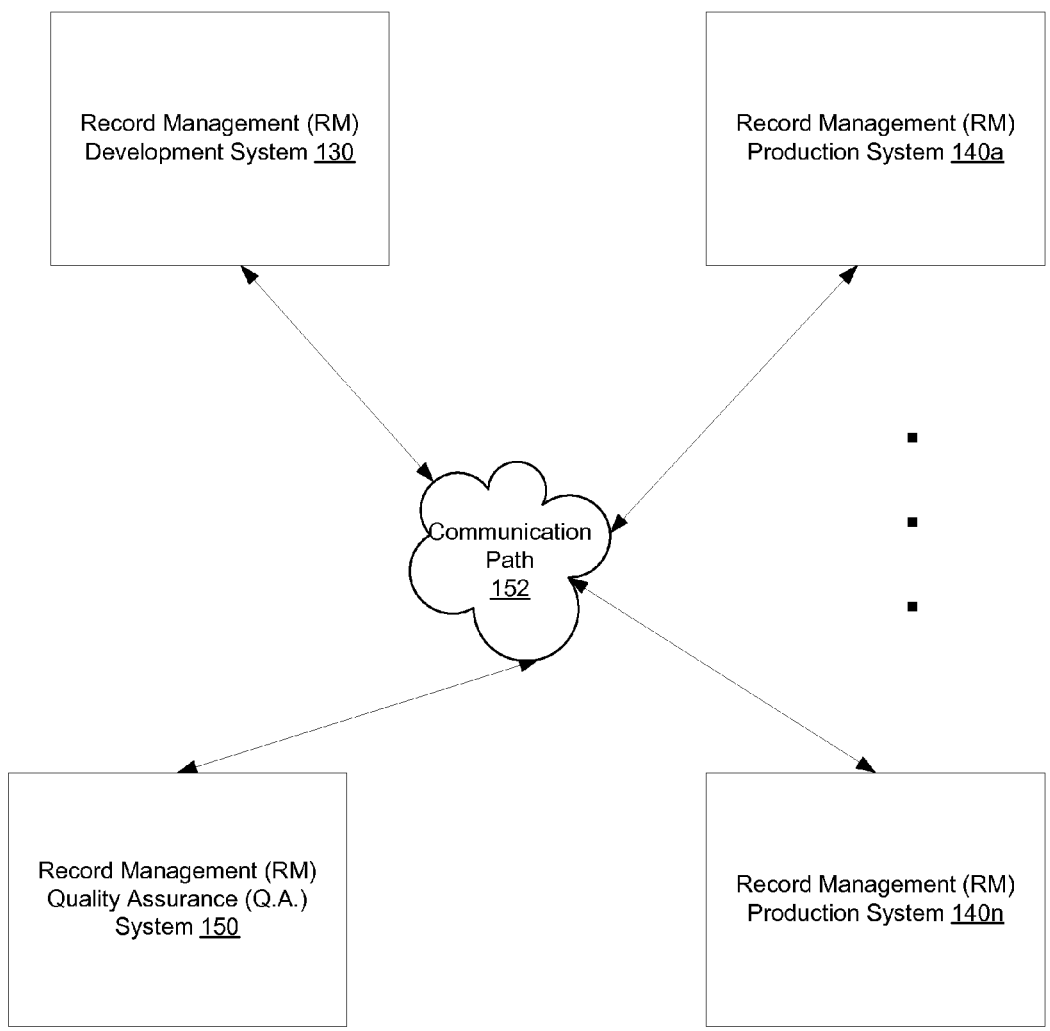
FIG. 2 illustrates an embodiment of a multi-system architecture.

FIG. 2 illustrates an embodiment of a multi-system architecture. A record management (RM) development system 130 is coupled, via a communication path 152, to record management (RM) production systems 140*a* . . . 140*n* and a record management (RM) quality assurance (Q.A.) system 150. With reference to the RM production systems 140*a* . . . 140*n*, the suffixes "a" and "n" and the ellipses indicate that there may be any number of RM production systems. In certain embodiments, there may be one RM production system coupled to one RM development system 130. A new file plan is typically created at the RM development system 130, where it is tested and, once approved, propagated to other systems 140*a* . . . 140*n*, 150. The file plan may be modified at an RM production system 140*a* . . . 140*n* or at the RM Q.A. system 150. Each RM system 130, 140*a* . . . 140*n*, 150 implements the architecture of server 100 shown in FIG. 1.

The communication path 152 may comprise any type of network, such as, for example, a peer-to-peer network, spoke and hub network, Storage Area Network (SAN), a Local Area Network (LAN), Wide Area Network (WAN), the Internet, an Intranet, etc. Thus, the systems 130, 140*a* . . . 140*n*, 150 may be located in different geographical regions or within a same room of a building.

FIG. 3 illustrates an embodiment of information included in an RIO 160, including an RIO identifier 162; document metadata 164 providing information on the document represented by the RIO, such as the document type, attributes of the document, and document content; a location reference 166 indicating the location of the document or object represented by the RIO; a disposition schedule 168 indicating an RIO level schedule for disposing of the document represented by the RIO; and a hold 170 comprising an RIO level hold to override any attempt to dispose of the document represented by the RIO. The RIO level disposition schedule 166 and hold 168 are optional, and may not be provided. The document referenced by the location reference 166 may comprise an electronic document, program or object. In such case, the location reference 166 provides the logical address that may be used to access the represented document. Alternatively, the document referenced by the location reference 166 may comprise a physical item. In such case, the location reference 166 indicates a physical location, such as floor, building, shelf, box, etc.

For instance, the RIO may represent documents comprising word processor documents, email messages, and graphics files; physical records, such as paper records, videotapes, portable storage media; vital records required for meeting operational responsibilities during an enterprise-wide emergency; permanent records identified as having sufficient historical or other value to warrant continued preservation by the organization beyond the time it is normally required for administrative, legal, or fiscal purposes.

Figure 4:
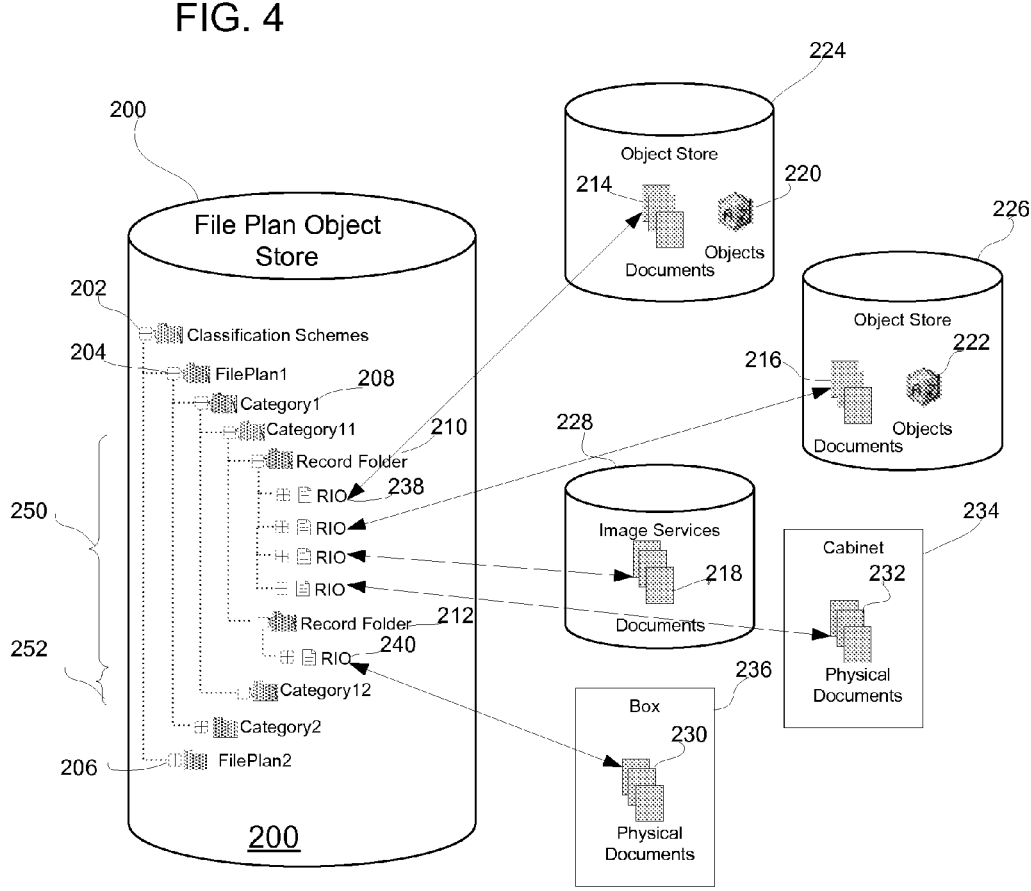
FIG. 4 illustrates an embodiment of a file plan object store.

FIG. 4 illustrates an embodiment of a file plan object store 200 comprising hierarchically arranged containers, where each container in the hierarchy may include other descendent containers, e.g., file plans, folders, record folders, categories, etc., and RIOs. A file plan object store 200 may be described as an object store that is enabled to contain a file plan. In one embodiment, the highest level node in the file plan object store 200 comprises a classification scheme node 202. At a next level, a set of file plans 204, 206 are each assigned to separate nodes. Each file plan defines an organization of records. Each file plan 204, 206 (e.g., FilePlan I) defines a hierarchy for storing RIOs such that their context is preserved. For example, in one embodiment a file plan hierarchy may reflect business functions of an enterprise. A record category (e.g., Category1 208) provides a first level of organization of RIOs under a file plan node of the exemplary hierarchical document record organization structure. Record categories are created to classify records based on functional categories. Examples of typical descriptive categories within a business enterprise are "Human Resources", "Accounting", "R&D", "Legal", "Marketing", etc. The record categories potentially contain either a sub-category container (e.g., Category11, Category 12) or a record folder container. Sub-category containers hold other sub-categories or record folders. Record folders contain actual RIOs 160.

A record folder 210, 212 serves as a container/collection of related RIOs. Record folders are used to manage RIOs according to retention periods, disposition events, and holds specified by their associated containers. The RIOs location references 166 (FIG. 3) may reference electronic documents 214, 216, 218 and objects 220, 222 (e.g., databases, programs, etc.) stored in electronic storage media in object stores 224, 226 or facilities 228. RIOs may also reference physical documents or items 230, 232 stored in a physical location, such as a cabinet 234 or box 236. Examples of physical documents stored in boxes 236 and cabinets 234 include large building plans, videotapes, or a database. The cabinet 234 and box 236 constructs provide mechanisms to model physical entities that contain other physical entities. For example, a "warehouse" contains "shelves" that contain "boxes" that contain the aforementioned physical folders. A box construct may contain another box, a physical folder, or a record. Hybrid folders are used as containers for a collection of related electronic and physical records.

The RIO nodes, e.g., 238, 240, in the file plan 200 reference and represent RIOs 160. The RIO nodes 238, 240 may comprise the RIO 160 itself or a pointer to the RIO 160 in a database or other location. An RIO may inherit file management rules (e.g., disposition schedules and holds) from the immediate record folder 210, 212 in which it is included.

In FIG. 4, Category 11 and its children may be designated as one segment 250, and Category 12 and its children may be another segment 252.

Figure 5:
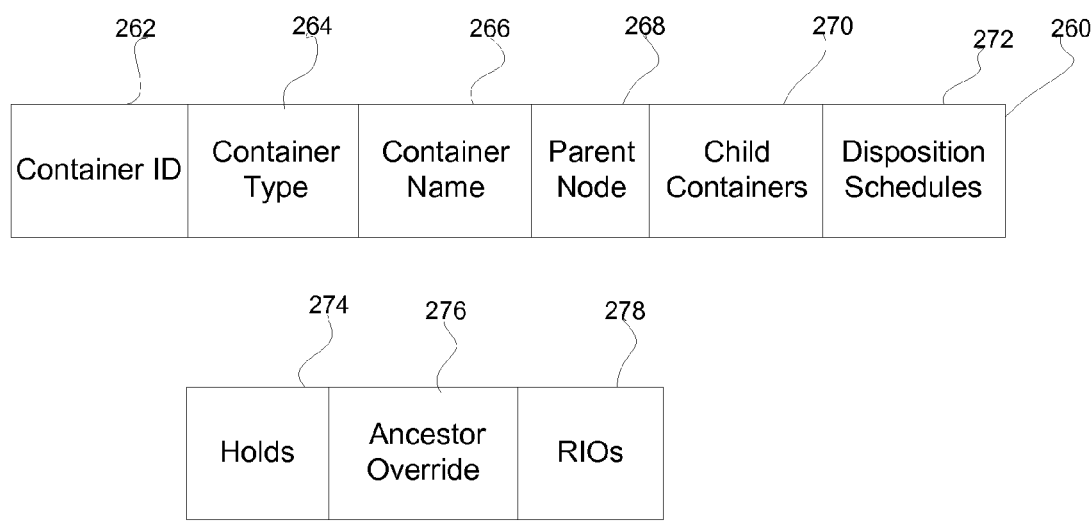
FIG. 5 illustrates an embodiment of information for a container in a file plan.

FIG. 5 illustrates an embodiment of container information 260 maintained for each container generated in a file plan. As discussed a container may comprise a classification scheme, file plan, category, record folder, or other logical subdivision of RIOs. The container information 260 includes:

container type field 262 indicating whether the container comprises a file plan, category, a sub-category, a record folder, etc.;

container identifier (ID) 264 indicating a unique ID of the container;

container name field 266 comprising a name associated with the container node (e.g., "Category1");

parent node field 268 indicating a direct parent node/container for the container in the file plan hierarchy;

child containers 270 comprising a list of all children containers (if any) within the container;

disposition schedules 272 if any, associated with the container, where each disposition schedule may provide a different rule for determining when to dispose (e.g., transfer, review, destroy, archive) of a document represented by an RIO included in the container, either directly or within a container that is a descendant of the container;

hold rules 274 indicating whether the document should be retained notwithstanding a disposition schedule indicating that the document represented by the RIO within the container should be disposed;

ancestor override flag 276 indicates whether disposition schedules from containers that are ancestors to the current container including the RIO should be applied to the RIOs within the current container;

RIOs 278: a list of RIOs included within the container.

Although the following FIGS. 6-10 describe logic performed by the RMA 102, in other embodiments, a separate application (e.g., a sync application) or component may perform this logic.

Figure 6:
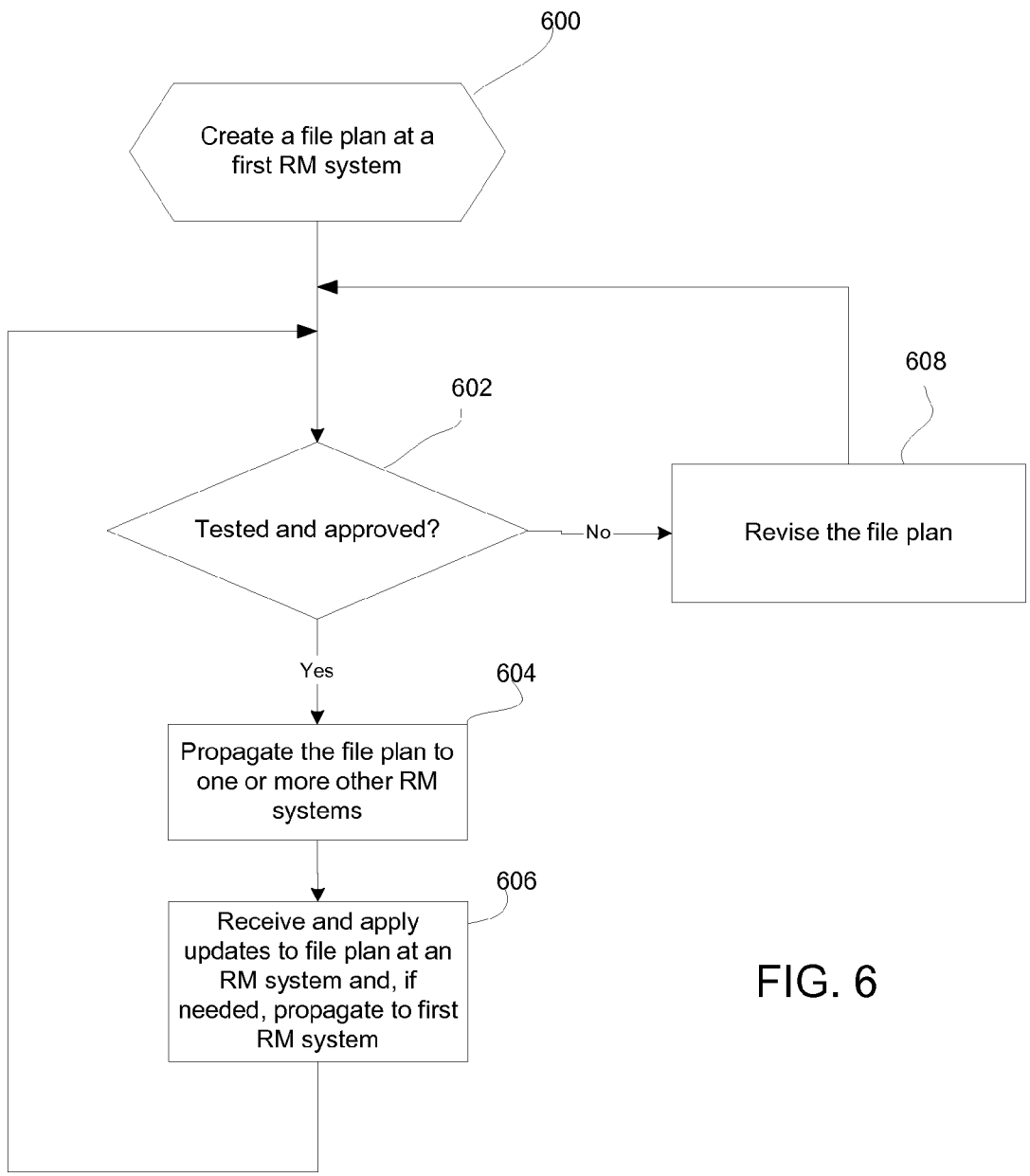
FIG. 6 illustrates an embodiment of logic performed by a records management application to sync file plan changes between two or more RM systems

FIG. 6 illustrates an embodiment of logic performed by the RMA 102 to sync file plan changes between two or more RM systems 130, 140a . . . 140n, 150. Control begins at block 600, with the RMA 102 creating a file plan at a first RM system (e.g., at a first RM development system130, in response to input from a programmer, developer, records manager, lawyer or other responsible person). In block 602, the RMA 102 or a records manager or administrator determines whether the file plan has been tested and approved. If the file plan has been tested and approved, processing continues to block 604, otherwise, processing continues to block 608. In block 604, the RMA 102 propagates the file plan to one or more RM systems, such as production systems 140a . . . 140n and Q.A. system 150. Optionally, in block 606, updates are received and applied to the file plan at an RM system 130, 140a . . . 140n, 150, and, if needed, the updates propagated to the first RM system (e.g., the RM development system 130). In certain embodiments, an updated file plan, rather than updates, is propagated. For example, if changes to the file plan are made at RM systems 140a . . . 140n, 150, the changes are propagated to the RM development system 130. From block 606, processing loops back to block 602, and these further changes are propagated to other RM systems after the changes are tested and approved. If the file plan has not been tested and approved, in block 608, the file plan is revised (e.g., by a programmer or developer), and processing loops back to block 602.

Thus, embodiments are able to take changes to a file plan in one RM development system 130 to another RM system 140a . . . 140n, 150 downstream from the RM development system 130. Also, embodiments are able to roll changes back into the RM development system 130 from other RM systems 140a . . . 140n, 150. From the RM development system 130, the changes are subsequently rolled out to all RM systems 140a . . . 140n, 150.

Figure 7:
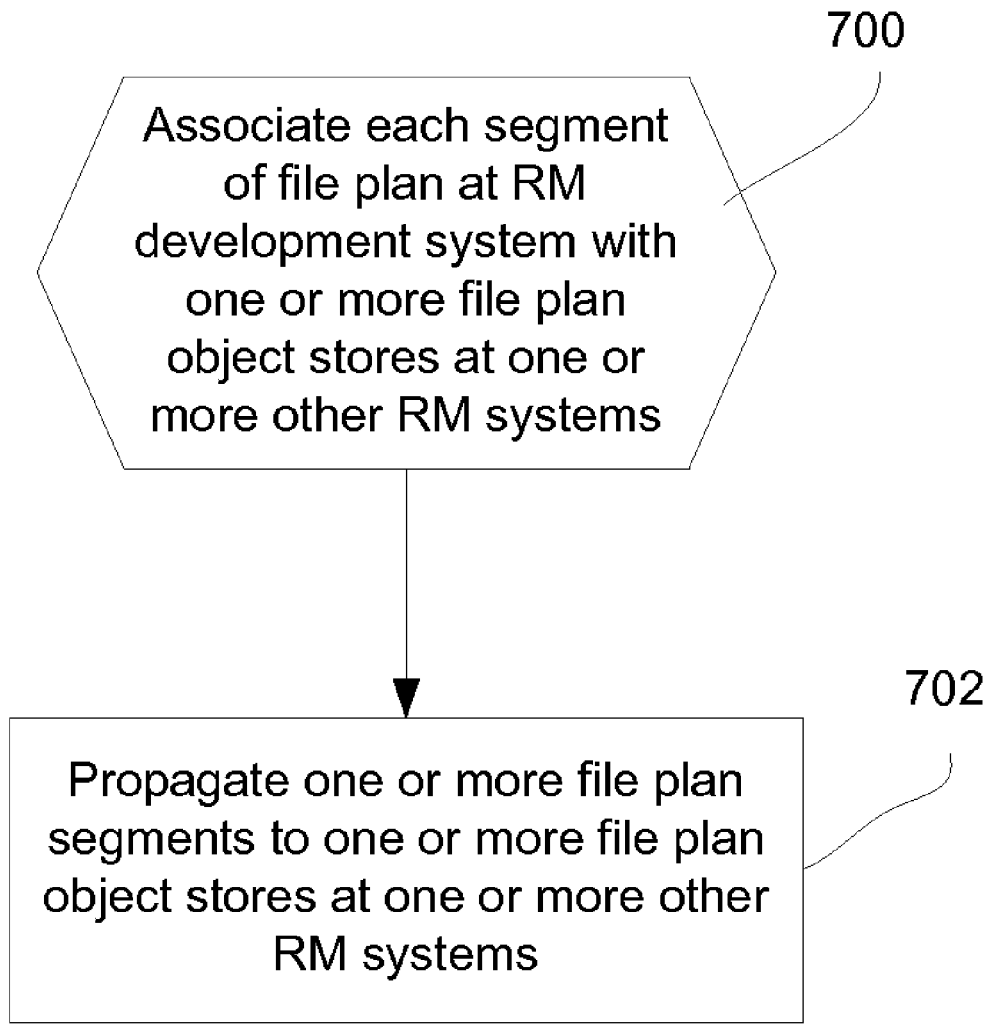
FIG. 7 illustrates an embodiment of logic performed by a records management application to propagate segments.

FIG. 7 illustrates an embodiment of logic performed by the RMA 102 to propagate segments. A segment may be described as a portion of a file plan. For example, in FIG. 4, Category 11 and its children may be designated as one segment 250, and Category 12 and its children may be another segment 252). Control begins at block 700 with the RMA 102 associating each segment of a file plan at the RM development system 130 with one or more file plan object stores at one or more other RM system 140a . . . 140n, 150. As described above, a file plan object store (e.g., file plan object store 200 in FIG. 4) may be described as an object store that is enabled to contain a file plan. In certain embodiments, a user interface enables portions of a file plan to be designated as segments and allows each of the segments to be associated with one or more object stores. The associations may be stored as metadata with the category or may be stored in a separate data structure, such as a table. In block 702, the RMA 102 propagates one or more file plan segments to one or more file plan object stores at one or more other RM system 140a . . . 140n, 150. The propagation may, for example, occur periodically (e.g., every day at a particular time) or may be driven by the administrator or records manager). Also, once a segment is selected, then the segment goes through a process similar to FIG. 6 for propagation and updates to the segment.

Thus, embodiments allow segments of file plans to be propagated to RM production system 140a . . . 140n file plan object stores, such that segmentA goes to "file plan object store ABC at RM production system 140a", SegmentB goes to "file plan object store XYZ at RM Q.A. system 150", etc. In certain embodiments, a segment may be propagated to multiple file plan object stores at one RM system 140a . . . 140n, 150. In certain embodiments, a segment may be propagated to multiple RM systems 140a . . . 140n, 150 at multiple locations for geographic disbursement.

Figure 8:
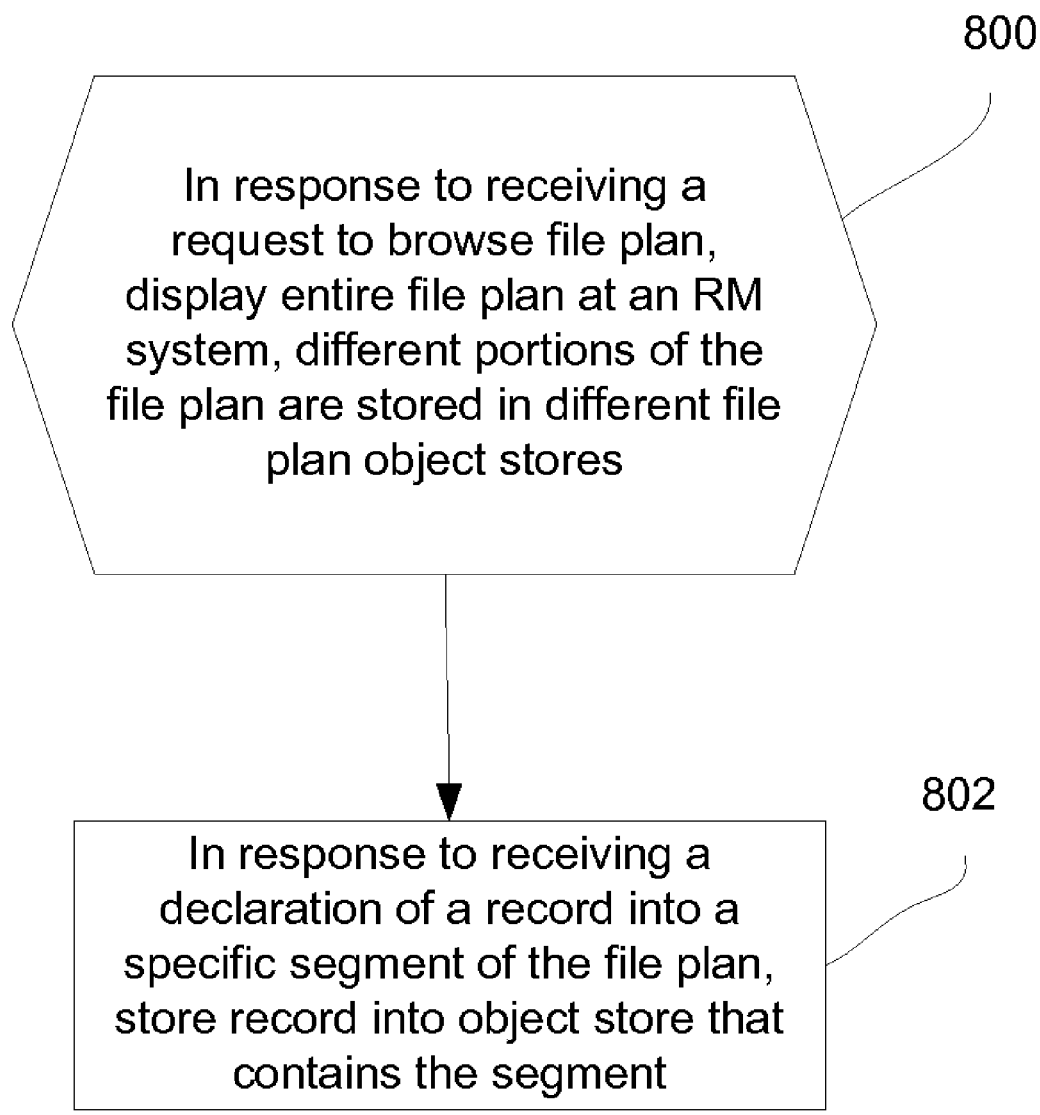
FIG. 8 illustrates an embodiment of logic performed by a records management application to provide access to file plans.

FIG. 8 illustrates an embodiment of logic performed by the RMA 102 (to provide access to file plans. Control begins at block 800 with the RMA 102, in response to receiving a request (e.g., from a user) to browse (i.e., view using a browser) a file plan at an RM system 130, 140a . . . 140n, 150, displays the entire file plan, wherein different portions of the file plan are stored in different file plan object stores. In certain embodiments, different portions of the file plan are stored in multiple local and/or remote file plan object stores. For example, one portion of the file plan may be stored in a local file plan object store and another portion of the file plan may be stored in a remote file plan object store. As another example, one portion of the file plan may be stored in a first local file plan object store and another portion of the file plan may be stored in a second local file plan object store. In block 802, in response to receiving (e.g., from a user) a declaration of a record into a specific segment of the file plan, the RMA 102 stores a record into the file plan object store that contains the segment. For example, a Segment1, deployed to System1, may be in Country1, where a user in that country declares a record into the local Segment1 in a Country1 file plan object store. A Segment2 may be in a Country2 file plan object store.

With embodiments, User2 in Country2 may be browsing and searching the file plan, and, even though Segment1 is not stored on a local, physical server for User2, User2 is able to see the entire file plan (including Segment 1 in Country1 file plan object store and Segmetn2 in Country2 file plan object store) as though the entire file plan were stored locally (e.g., User2 sees all of the file plan 204 in FIG. 4, even though only part of that file plan 204 is stored locally).

Figure 9:
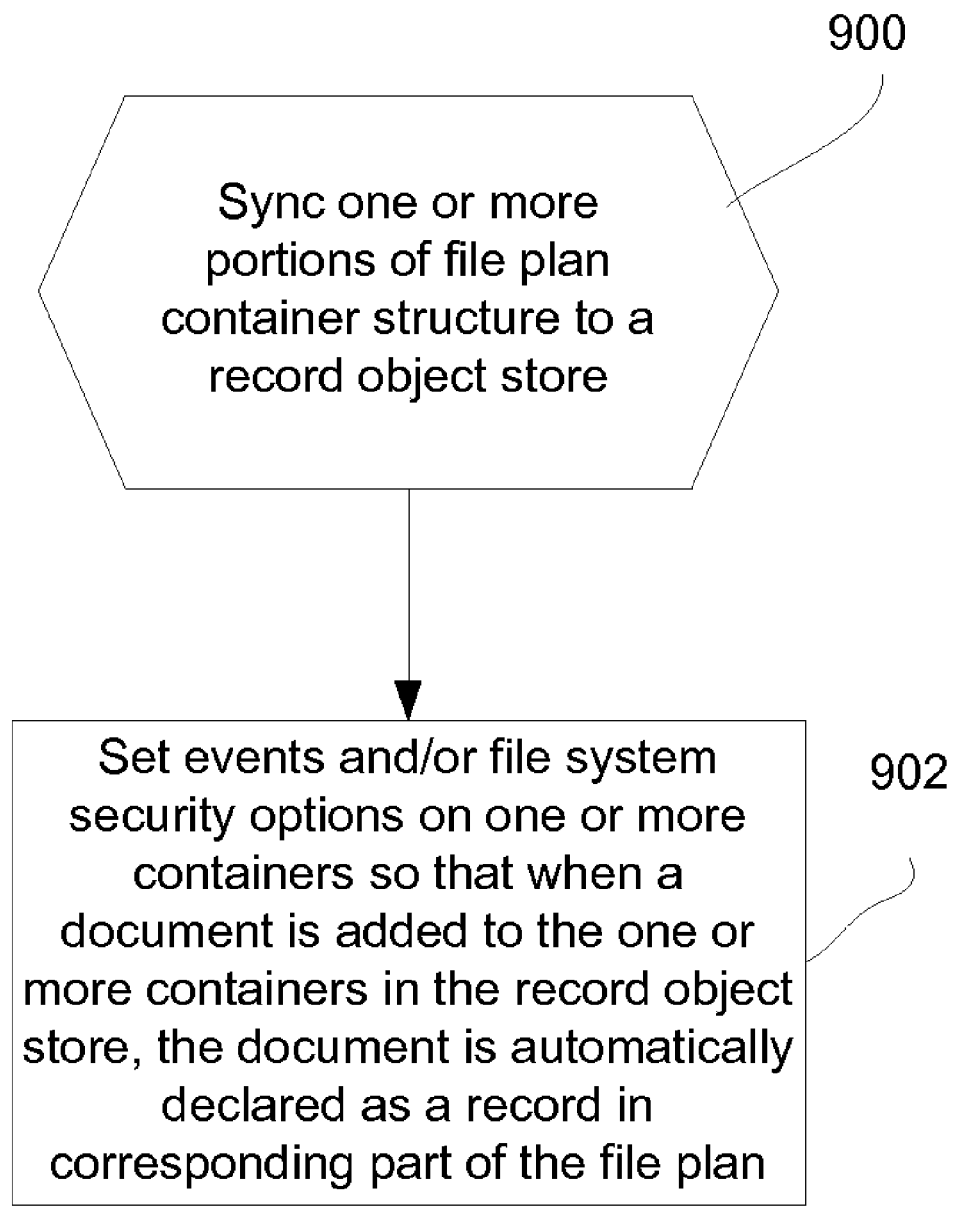
FIG. 9 illustrates an embodiment of logic performed by a records management application to sync an RM system with a record object store (ROS).

FIG. 9 illustrates an embodiment of logic performed by the RMA 102 to sync a file plan container structure system with a record object store (ROS). A file plan container structure may be described as the hierarchical structure of the file plan. An example file plan container structure is illustrated in the file plan object store 200 in FIG. 4. An object store 224, 226 may be described as a location in which documents may be saved in a document or content management system. The object store 224, 226 typically contains a container structure and files. A record object store (ROS) may be described as an object store that is enabled to have the documents or objects contained therein declared as records. In certain embodiments, object stores 224, 226 are record object stores.

Control begins at block 900 with the RMA 102 syncing one or more portions (i.e., all or part) of a file plan container structure to a record object store. In certain embodiments, to sync the file plan container structure to the record object store, the containers (e.g., folders) of a file plan are replicated at a designated location in a record object store. For example, FilePlan1 204 (FIG. 4) or segment 250 may be replicated in object store 224.

In block 902, the RMA 102 sets events and or file system security options on one or more containers (e.g., folders) so that when a document is added to the one or more containers (e.g., folders) in a record object store, the document is automatically declared as a record in the corresponding part of the file plan. An event may be described as any action, trigger or condition that causes another action or creates another condition. For example, an event may be a user action, such as a document being added to a folder or metadata of the document being modified. A file system security option (commonly referred to as an Access Control List (ACL)) may be described as a security option for the file system at the operating system level. For example, for a folder in the record object store called "Invoices", there may be an event declaring that any document filed in that folder is to have a record in the Invoices section of the file plan.

Figure 10:
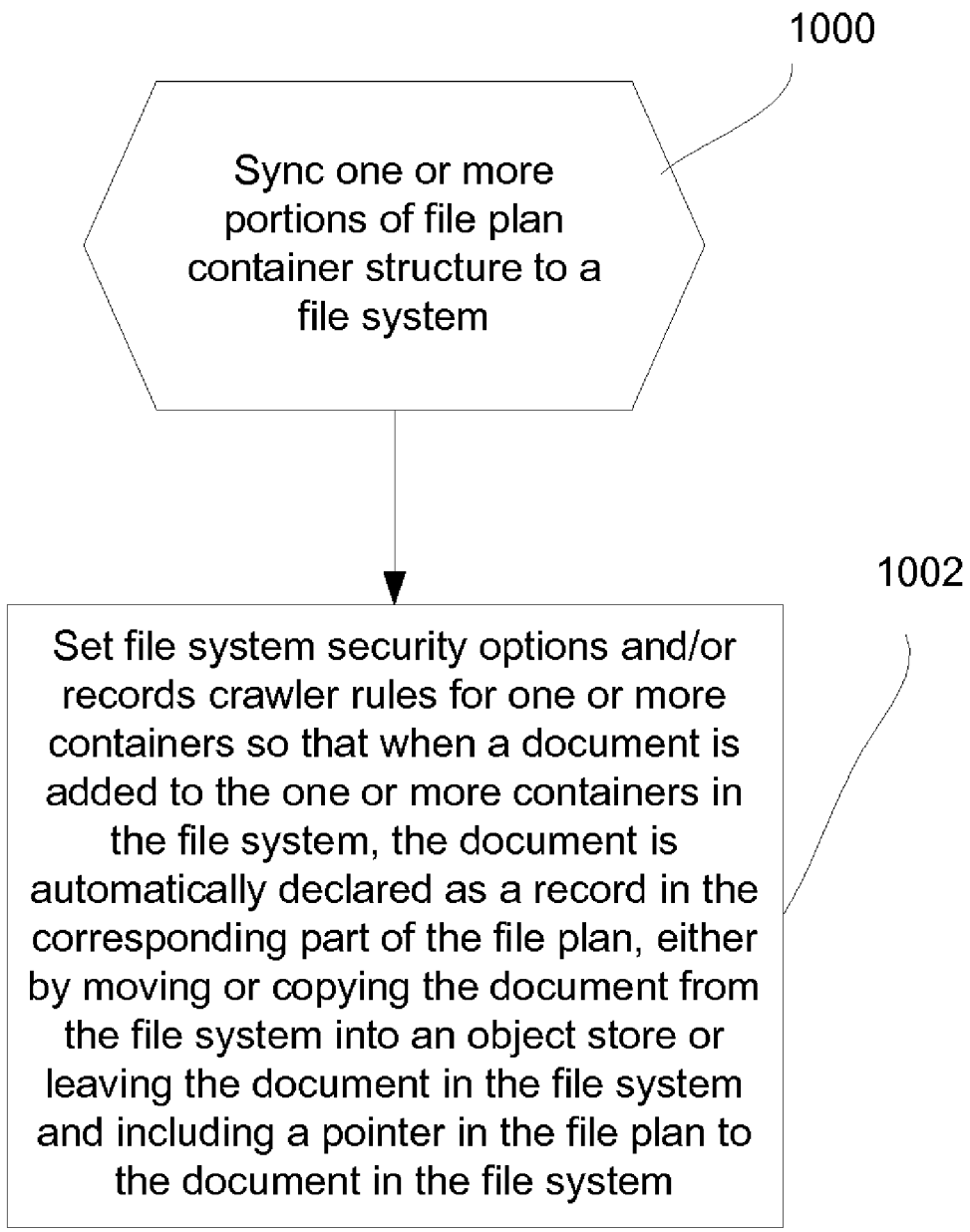
FIG. 10 illustrates an embodiment of logic performed by a records management application to sync an RM system to a file system.

FIG. 10 illustrates an embodiment of logic performed by the RMA 102 to sync a file plan container structure to a file system. A file system may be described as a way in which files are named and located for storage and retrieval (e.g., an NT file system used by the Windows® NT operating system or a file server (Windows is a registered trademark of Microsoft Corporation in the United States and/or other countries). The file plan container structure may be described as being at an application level, while the file system may be described as being at an operating system level. Thus, embodiments enable the file system at the operating system level to mirror part or all of the file plan container structure (e.g., one or more segments may be mirrored).

Control begins at block 1000 with the RMA 102 syncing one or more portions (i.e., all or part) of a file plan container structure to a file system. In certain embodiments, to sync one or more portions of the file plan container structure to the file system, the containers (e.g., folders) of a file plan are replicated at a designated location in a file system. For example, FilePlan1 204 (FIG. 4) or a segment 250 may be replicated in a file system. In block 1002, the RMA 102 sets file system security options and/or records crawler rules for one or more containers (e.g., folders) so that when a document is added to the one or more containers in the file system, the document is automatically declared as a record in the corresponding part of the file plan, either by moving or copying the document from the file system into an object store or leaving the document in the file system and including a pointer in the file plan to the document in the file system. Again, a file system security option (commonly referred to as an Access Control List (ACL)) may be described as a security option for the file system at the operating system level. A records crawler rule may be described as a rule that is enforced by a records crawler component (not shown in FIG. 1).

Thus, embodiments bring record and configuration data from downstream systems back into the development system for test and other purposes. For example, changes made to a file plan in an RM production system 140a . . . 140n are brought back to the RM development system 130, where testing of the file plan typically occurs.

Embodiments make enterprise deployment of records management systems practical. Embodiments enable file plan propagation in various scenarios.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The computer-usable medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

In certain embodiments, the file sets and metadata are maintained in separate storage systems and commands to copy the file sets and metadata are transmitted by systems over a network. In an alternative embodiment, the file sets and metadata may be maintained in a same storage system and the command to copy may be initiated by a program in a system that also directly manages the storage devices including the file sets and metadata to copy.

The illustrated operations of FIGS. 6, 7, 8, 9, and 10 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The illustrated logic of FIGS. 6, 7, 8, 9, and 10 may be implemented in software, hardware, programmable and non-programmable gate array logic or in some combination of hardware, software, or gate array logic.

FIGS. 3, 4, and 5 provide embodiments of information included in the RIO, file plan, and container. In alternative embodiments, the RIOs, file plan, and containers may include different or additional information.

Figure 11:
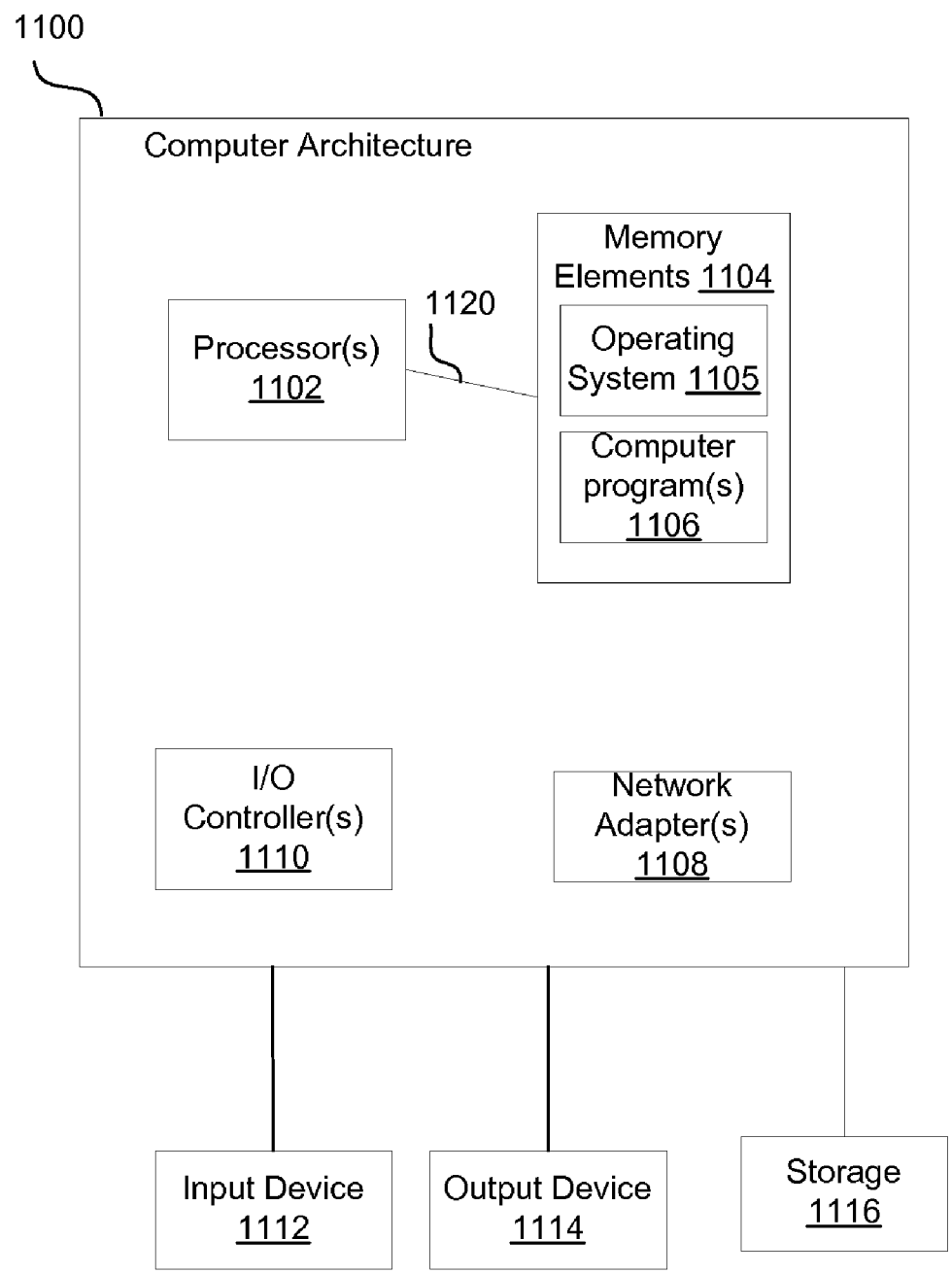
FIG. 11 illustrates an embodiment of a system architecture.

FIG. 11 illustrates an embodiment of a system architecture 1100. RM development, production, and quality assurance systems 130, 140*a* . . . 140*n*, and 150 may implement system architecture 1100. The system architecture 1100 is suitable for storing and/or executing program code and includes at least one processor 1102 coupled directly or indirectly to memory elements 1104 through a system bus 1120. The memory elements 1104 may include local memory employed during actual execution of the program code, bulk storage, and cache memories which provide temporary storage of at least some program code in order to reduce the number of times code must be retrieved from bulk storage during execution. The memory elements 1104 include an operating system 1105 and one or more computer programs 1106.

Input/Output (I/O) devices 1112, 1114 (including but not limited to keyboards, displays, pointing devices, etc.) may be coupled to the system either directly or through intervening I/O controllers 1110.

Network adapters 1108 may also be coupled to the system to enable the data processing system to become coupled to other data processing systems or remote printers or storage devices through intervening private or public networks. Modems, cable modem and Ethernet cards are just a few of the currently available types of network adapters 1108.

The system architecture 1100 may be coupled to storage 1116 (e.g., a non-volatile storage area, such as magnetic disk drives, optical disk drives, a tape drive, etc.). The storage 1116 may comprise an internal storage device or an attached or network accessible storage. Computer programs 1106 in storage 1116 may be loaded into the memory elements 1104 and executed by a processor 1102 in a manner known in the art.

The system architecture 1100 may include fewer components than illustrated, additional components not illustrated herein, or some combination of the components illustrated and additional components. The system architecture 1100 may comprise any computing device known in the art, such as a mainframe, server, personal computer, workstation, laptop, handheld computer, telephony device, network appliance, virtualization device, storage controller, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complee description of the manufacture and use of the composition of the invention. Since many embodiments of the invention can be made without departing from the spirit and scope of the invention, the invention resides in the claims hereinafter appended and/or any subsequently-filed claims, and their equivalents.

What is claimed is:

1. A method, comprising:
   providing, with a computer including a processor, a file plan including hierarchically arranged containers for classifying record information objects, wherein each container provides management information for the record information objects assigned to the container, wherein the record information objects represent documents, wherein the file plan includes at least a first segment comprising a first container and children of the first container and a second segment comprising a second container and children of the second container;
   associating the first segment of the file plan at a first records management system with one or more file plan object stores at a second records management system;
   propagating the first segment from the first records management system to the one or more file plan object stores at the second records management system;
   associating the second segment of the file plan at the first records management system with one or more file plan object stores at a third records management system;
   propagating the second segment from the first records management system to the to the one or more file plan object stores at the third records management system;
   in response to receiving updates to the first segment, propagating the updates to the first segment from the first records management system to the one or more file plan object stores at the second records management system; and
   in response to receiving updates to the second segment, propagating the updates to the second segment from the first records management system to the one or more file plan object stores at the third records management system.

2. The method of claim 1, wherein the first records management system comprises a records management development system.

3. The method of claim 1, wherein the one or more other records management systems include records management production systems.

4. The method of claim 1, wherein the one or more other records management systems include records management quality assurance systems.

5. The method of claim 1, further comprising:
   receiving updates to the file plan at the first records management system;
   determining that the updated file plan has been tested and approved; and
   propagating the updated file plan to the one or more other records management systems.

6. The method of claim 1, further comprising:
   receiving updates to the file plan at one of the one or more other records management systems; and
   propagating the updates to the first records management system.

7. The method of claim 1, further comprising:
   in response to receiving a request to browse the file plan, displaying an entire file plan, wherein different portions of the file plan are stored in different file plan object stores.

8. The method of claim 1, further comprising:
   in response to receiving a declaration of a record into a specific segment of the file plan, storing the record into the one or more file plan object stores at one or more other records management systems associated with the segment.

9. A computer program product comprising a computer-readable medium storing a computer readable program, wherein the computer readable program when executed by a processor on a computer causes the computer to:
   provide a file plan including hierarchically arranged containers for classifying record information objects, wherein each container provides management information for the record information objects assigned to the container, wherein the record information objects represent documents, wherein the file plan includes at least a first segment comprising a first container and children of the first container and a second segment comprising a second container and children of the second container;
   associate the first segment of the file plan at a first records management system with one or more file plan object stores a second records management system;
   propagate the first segment from the first records management system to the one or more file plan object stores at the second records management system;
   associate the second segment of the file plan at the first records management system with one or more file plan object stores at a third records management system;
   propagate the second segment from the first records management system to the to the one or more file plan object stores at the third records management system;
   in response to receiving updates to the first segment, propagate the updates to the first segment from the first records management system to the one or more file plan object stores at the second records management system; and
   in response to receiving updates to the second segment, propagate the updates to the second segment from the first records management system to the one or more file plan object stores at the third records management system.

10. The computer program product of claim 9, wherein the first records management system comprises a records management development system.

11. The computer program product of claim 9, wherein the one or more other records management systems include records management production systems.

12. The computer program product of claim 9, wherein the one or more other records management systems include records management quality assurance systems.

13. The computer program product of claim 9, wherein the computer readable program when executed on a computer causes the computer to:
   receive updates to the file plan at the first records management system;
   determine that the updated file plan has been tested and approved; and
   propagate the updated file plan to the one or more other records management systems.

14. The computer program product of claim 9, wherein the computer readable program when executed on a computer causes the computer to:
  receive updates to the file plan at one of the one or more other records management systems; and
  propagate the updates to the first records management system.

15. The computer program product of claim 9, wherein the computer readable program when executed on a computer causes the computer to:
  in response to receiving a request to browse the file plan, display an entire file plan, different portions of the file plan are stored in different file plan object stores.

16. The computer program product of claim 9, wherein the computer readable program when executed on a computer causes the computer to:
  in response to receiving a declaration of a record into a specific segment of the file plan, store the record into the one or more file plan object stores at one or more other records management systems associated with the segment.

17. A system, comprising:
  a processor; and
  hardware logic performing operations, the operations comprising:
    providing a file plan including hierarchically arranged containers for classifying record information objects, wherein each container provides management information for the record information objects assigned to the container, wherein the record information objects represent documents, wherein the file plan includes at least a first segment comprising a first container and children of the first container and a second segment comprising a second container and children of the second container;
    associating the first segment of the file plan at a first records management system with one or more file plan object stores at a second records management system;
    propagating the first segment from the first records management system to the one or more file plan object stores at the second records management system;
    associating the second segment of the file plan at the first records management system with one or more file plan object stores at a third records management system;
    propagating the second segment from the first records management system to the to the one or more file plan object stores at the third records management system;
    in response to receiving updates to the first segment, propagating the updates to the first segment from the first records management system to the one or more file plan object stores at the second records management system; and
    in response to receiving updates to the second segment, propagating the updates to the second segment from the first records management system to the one or more file plan object stores at the third records management system.

18. The system of claim 17, wherein the first records management system comprises a records management development system.

19. The system of claim 17, wherein the one or more other records management systems include records management production systems.

20. The system of claim 17, wherein the one or more other records management systems include records management quality assurance systems.

21. The system of claim 17, wherein the operations further comprise:
  receiving updates to the file plan at the first records management system;
  determining that the updated file plan has been tested and approved; and
  propagating the updated file plan to the one or more other records management systems.

22. The system of claim 17, wherein the operations further comprise:
  receiving updates to the file plan at one of the one or more other records management systems; and
  propagating the updates to the first records management system.

23. The system of claim 17, wherein the operations further comprise:
  in response to receiving a request to browse the file plan, displaying an entire file plan, different portions of the file plan are stored in different file plan object stores.

24. The system of claim 17, wherein the operations further comprise:
  in response to receiving a declaration of a record into a specific segment of the file plan, storing the record into the one or more file plan object stores at one or more other records management systems associated with the segment.

* * * * *